Feb. 2, 1971  O. FISHER  3,560,366
AG-O-MAT SILVER RECOVERY UNIT
Filed April 12, 1968
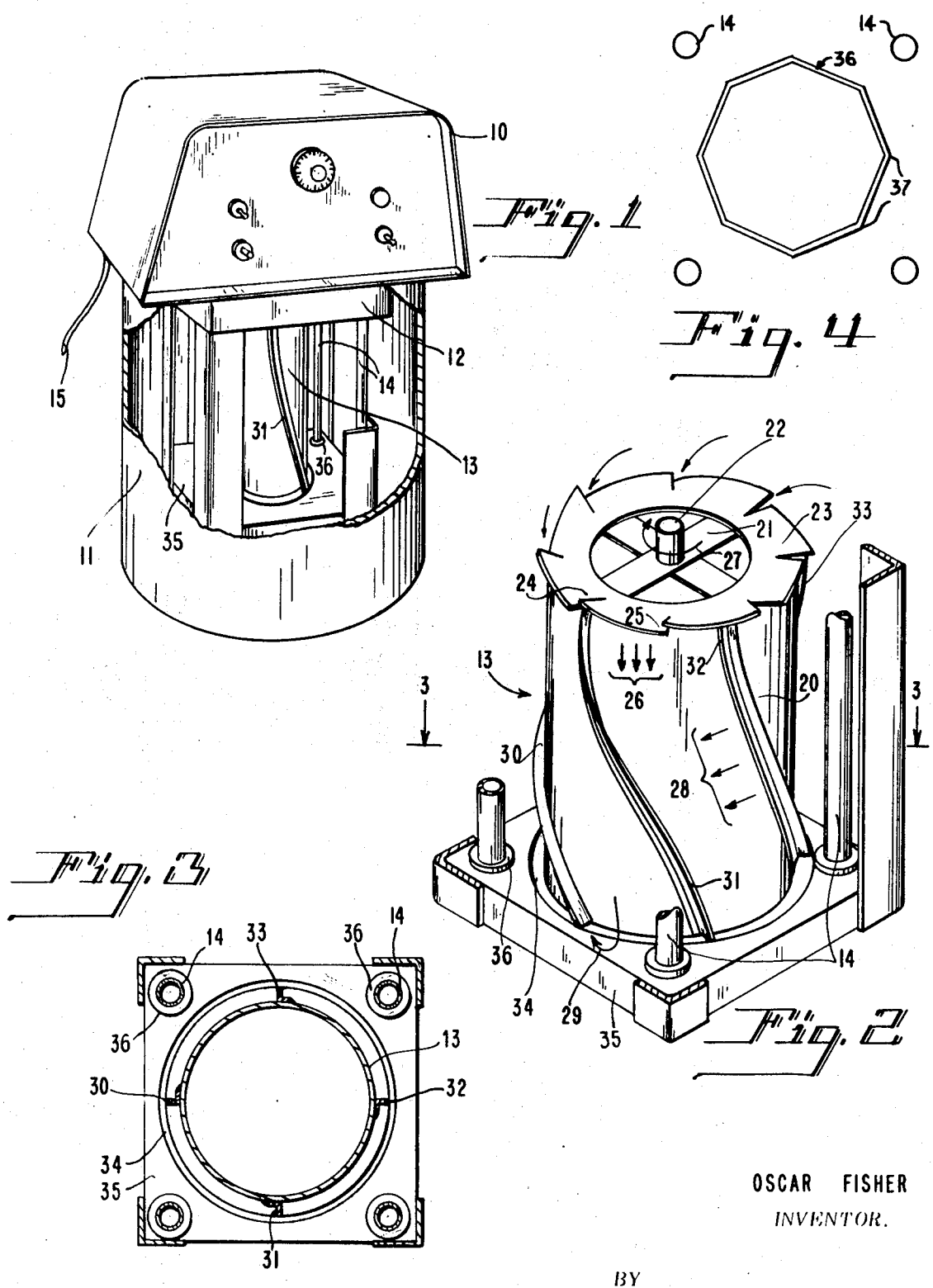
OSCAR FISHER
INVENTOR.
BY
Robert R. Strack
ATTORNEY

United States Patent Office 3,560,366
Patented Feb. 2, 1971

3,560,366
Ag-O-MAT SILVER RECOVERY UNIT
Oscar Fisher, Mountainville, N.Y.
(P.O. Box 2305, Newburgh, N.Y. 12550)
Filed Apr. 12, 1968, Ser. No. 720,779
Int. Cl. C23b 5/76; C22d 1/02
U.S. Cl. 204—212                                            9 Claims

ABSTRACT OF THE DISCLOSURE

Apparatus for recovering silver from used photographic fixing solutions by the electrolytic method employing a uniquely designed cathode with integrally formed means for agitating the fixer solution as the cathode is rotated about a vertical axis in close proximity to a plurality of vertically disposed anodes.

BACKGROUND OF THE INVENTION

It is well known that the silver present within used photographic fixing baths can be profitably recovered. A number of techniques have been developed for this silver recovery and they are of varying degrees of effectiveness. Basically, there are three methods: metallic replacement, chemical precipitation, and electrolytic. The metallic replacement method involves bringing a used fixer solution into contact with a metal that is less noble than silver. The less noble metal will then be replaced by the silver. For example, if steel is used, it will go into solution and the silver will replace it. In the chemical precipitation method, the silver in a used fixer solution is precipitated in the form of a sludge of silver sulphide and other compounds which is then removed from the solution, dried, and packaged for subsequent handling by a silver refiner. The most attractive recovery method at the present time is the electrolytic method wherein an electric current is passed between an anode and cathode suspended within a used fixer solution, and the silver plates out on the cathode.

There are at least two measures of the effectiveness of a silver recovery system when used in connection with photographic fixer solutions. The first test is the amount of silver recovered for the cost involved in the recovery process. The second test is the degree of reusability of the fixer solution after the silver has been recovered. It is obviously advantageous to extract a maximum amount of pure silver for a minimum investment in time and silver recovery equipment. Furthermore, it is desirable to perform this extraction in a manner which will permit reuse of the fixer solution rather than require its discharge.

In electrolytic recovery systems, it has become recognized that the unit must be operated under relatively carefully controlled current density conditions. When the current density becomes too high for the amount of silver present, the cathode tends to accumulate silver sulphide rather than pure silver and this hampers or destroys the plating process and also renders the fixer solution unfit for subsequent use. In the event that too low a current density is maintained, insufficient silver will be recovered for economical employment. It has been discovered that agitation or recirculation within the bath is of considerable assistance in furnishing a continuous supply of silver-laden fixer solution to the cathode. Where agitation is used, higher current densities can be employed than would be the case in the absence of agitation and this raises the recovery rate. In fact, units have been proposed wherein the cathode is rotated within the fixer solution relative to the anode. The present invention is concerned with improved apparatus of this type.

SUMMARY OF THE INVENTION

In accordance with the present invention there is provided an electrolytic silver recovery unit comprising a plurality of anodes and a rotating cathode positioned within a used photographic fixer solution.

The invention includes the improvement wherein the cathode is in the tubular form of a cylinder or polyhedron mounted for rotation about a vertical axis, with the anodes being disposed along vertical axes in close proximity to the surface of the cathode. With this arrangement, integral means are provided on the cathode for developing a controlled interchange of the fixer solution across the surface thereof. As illustrated by one specific embodiment discussed hereinafter, the cathode may comprise a cylinder formed with a stainless steel surface and have fluid impeller means at the upper edge thereof and across the surface thereof in order to develop flow of the fixer solution in both axial and circumferential directions. As illustrated by a second specific embodiment, the cathode may be formed as a polyhedron wherein the apexes act to develop the desired flow of fixer solution.

It is an object of the present invention to provide improved apparatus for the recovery of silver from used photographic fixer solutions in an economical and efficient fashion.

It is also an object of the present invention to provide improved apparatus for the recovery of silver from used photographic fixer solutions wherein a rotating cathode induces interchange of the fluid at its surface.

It is another object of the invention to provide improved electrolytic silver recovery utilizing a uniquely designed rotating cathode as the only means for creating turbulence of a solution containing silver.

Another object of the present invention is to provide a unit for the electrolytic recovery of silver from used photographic fixing solutions which provides agitation of the solution in several directions simultaneously and effects a recovery with a relatively high current density and at a relatively high rate.

Still further, it is an object of the present invention to provide improved apparatus for recovery of silver from used photographic fixer solutions wherein the solutions are minimally contaminated and therefor may be used a plurality of times after the silver has been removed therefrom.

One of the features of the invention is the fact that the cathode is formed as a cylinder or polyhedron and the anodes are disposed in close proximity thereto. As a direct result of this structural configuration, each portion of the surface of the cathode can be uniformly and recurrently brought into close proximity to the anode during recovery operations. A large surface area of the cathode is available for plating at a constant distance from the anodes, and in addition, the silver can be easily removed following the plating.

Another feature of the invention resides in the fact that no pumps are required for circulation of the solution because impellers which are an integral part of the cathode create the necessary agitation of the solution to provide the improved plating results.

These specifically novel features of the invention, in addition to others, are set forth with particularity in the appended claims. The invention itself, however, may best be understood by reference to the following description taken in conjunction with the accompanying drawing.

BRIEF DESCRIPTION OF THE DRAWINGS

FIG. 1 is a perspective view of an illustrative embodiment of the invention showing an entire unit assembled for operation;

FIG. 2 is a perspective view showing the structure of a novel cathode cylinder and its relationship to the base of the support frame and the anodes;

FIG. 3 is a sectional view taken along the line 3—3 shown in FIG. 2; and

FIG. 4 is a schematic sectional view illustrating the relative position of a polyhedral cathode and the anodes.

DESCRIPTION OF THE PREFERRED EMBODIMENT

As shown in FIG. 1, the assembled unit includes an electrical control portion 10 comprising the necessary rectifying components and an electric motor for driving a rotating cathode 13 and establishing the necessary voltage relationship between cathode 13 and the anodes 14. As illustrated, control portion 10 is positioned above a drum 11, which may be of polyethylene or the like, so that the cathode 13 and anodes 14 are vertically disposed within the fluid contained by the drum. In the disclosed illustrative embodiment, there are four anodes 14 positioned in close proximity to the surface of the cathode 13. A frame 12 supports control portion 10 and the various other components in their proper relationship and also maintains the entire unit slightly raised from the bottom of drum 11 in order to permit flow of fluid under the unit.

By way of example, it is noted that a model of the unit illustrated in FIG. 1 has dimensions approximately 25 inches long x 15 inches wide x 30 inches high, and weighs approximately 30 pounds. This unit is adapted for use with a standard 115-volt, single-phase, 60-cycle circuit and includes a motor for rotating the cathode within a range of 50 to 200 revolutions per minute. It is capable of recovering 98% pure silver at a rate of 57 grams per hour.

One form of cathode construction according to the invention may be best appreciated by consideration of FIG. 2. In this figure, it will be seen that the cathode 13 is a hollow cylinder having a smooth surface 20 which may be made of a stainless steel or equivalent material. The cylinder is supported by cross braces 21 at the upper and lower ends which are rigidly secured to bearings 22 to permit suitable mounting for rotation. As illustrated by arrow 27, the embodiment shown in FIG. 2 is adapted for rotation in a clockwise direction when viewed from above.

At the upper end of the cathode 13, an impeller 23 is positioned. The impeller has a number of fins projecting radially outward and canted to create fluid flow in a downward direction when the cylinder is rotated. This downward flow is illustrated by arrows 26. Impeller 23 may be of relatively simple construction with each blade arranged so that the leading edge 24 is higher than the trailing edge 25.

In order to create a further flow of fluid and thereby develop the desired controlled interchange of silver-ladened solution at the surface of the cylinder, a number of fins 30, 31, and 32 are provided on the surface of the cylinder itself. The fins project radially from the surface 20 and are disposed at an acute angle to the direction of rotation. This creates a flow of fluid which is both circumferential and axially downward. Arrows 28 illustrate the effect of fin 32, as typical. The cylinder 20 contains four fins which are wound as a partial helix about 90° of the circumference of the cylinder. Of course, the number of fins and the amount of wrap is selected to provide maximum flow conditions for the particular diameter and length of the cylinder.

The cylinder mounting is provided with a base portion 35 of the frame so that the fluid flowing downward across the surface 20 of the cylinder is deflected at the base portion as shown by arrow 29 in order to again flow upwardly. This mounting also includes a circular opening 34 to allow fluid flow between the top and bottom of base portion 35.

FIG. 3 shows most clearly the positioning and mounting of the respective elements of the unit. The cylinder 13 is centrally positioned on frame 12 with four anodes 14 located at each corner of the square base 35. Opening 34 in the base 35 is slightly larger in diameter than the total outside diameter of the cathode including impellers 30, 31, 32, and 33. Anodes 14 are secured to frame 12 at the top and bottom by electrically insulating grommets 36, and all necessary electrical isolation is easily accomplished by suitable selection of materials and mountings. The sectional view in FIG. 3 is particularly apt for a showing of how the complete surface area of cathode 13 can be presented at a close predetermined distance from the anodes 14 to insure an even deposition of silver and to permit use of high current densities.

The surface of cathode 13 may also be made as a plurality of interconnected planar areas. In this specification, the general term "polyhedron" has been employed to define the contemplated configuration. Structurally, the cathode may be hollow and there is no specific limit on the number of sides employed. However, FIG. 4 illustrates an octagonal polyhedron 36, that has been found to be very effective as a cathode.

When a polyhedral cathode is used, the apexes 37 of the cathode perform the fluid impelling functions of the fins 30, 31, 32, and 33 shown in conjunction with the aforedescribed cylindrical cathode configuration. The polyhedron may have vertically disposed apexes or they may be canted to produce an axial fluid flow.

In order to operate the silver recovery unit of the present invention it is simply necessary to rotate the cylinder while current is applied to establish a voltage difference between the anode and cathode. The silver is deposited upon the cathode itself and after a sufficient amount is plated thereon, the entire cylinder is removed and dried. After drying, the silver may be stripped off.

While several embodiments of the invention have been shown and described, it is appreciated that modifications of the invention will be immediately apparent to those skilled in the art. It is contemplated in the appended claims to cover all modifications of the invention which fall within the spirit and teachings of the above description.

What is claimed is:

1. In an electrolytic silver recovery unit comprising a plurality of anodes and a rotating cathode positioned within a used photographic fixing solution, said cathode being in substantially tubular form mounted for rotation about a vertical axis in said solution, said anodes being disposed along vertical axes in close proximity to the surface of said cathode, the improvement comprising an impeller at the upper end of said cathode with blades arranged to deflect the solution in a substantially downward direction in proximity to the cathode surface when the cathode is rotated, said cathode having a substantially smooth surface and including integral means for deflecting the solution in contact therewith in a substantially tangential direction.

2. An electrolytic silver recovery unit as defined in claim 1, wherein said cathode successively places the entire surface area thereof in close proximity to each anode during a complete rotation.

3. An electrolytic silver recovery unit as defined in claim 1, wherein said cathode is a polyhedron.

4. An electrolytic silver recovery unit as defined in claim 1, wherein said cathode is a cylinder.

5. An electrolytic silver recovery unit as defined in claim 1, including means for rotating said cathode within a range of 50 to 200 revolutions per minute.

6. An electrolytic silver recovery unit as defined in claim 1, wherein said integral means is substantially longitudinally disposed across the surface of said cathode to create a flow of solution in proximity to the surface having substantial axial and tangential components.

7. An electrolytic silver recovery unit as defined in claim 6 having a base adapted to deflect solution flowing downward adjacent to the surface of the cathode and create an upward fluid flow at a slight distance from the surface.

8. An electrolytic silver recovery unit as defined in claim 1, wherein said cathode is a cylinder which has at least one fin radially projecting from the surface thereof and arranged at an angle to the direction of rotation, thereby deflecting the solution in a forward and downward direction when the cathode is rotated.

9. In an electrolytic silver recovery unit comprising a plurality of anodes and a rotating cathode positioned within a used photographic fixing solution, said cathode being in tubular form mounted for rotation about a vertical axis in said solution, said anodes being disposed along vertical axes in close proximity to the surface of said cathode, the improvement comprising an impeller at the upper end of said cathode with fins projecting radially from the surface thereof and canted to deflect the solution in a downward direction when the cathode is rotated, said cathode being a cylinder having at least one fin projecting from the surface thereof arranged in a partial helix about the axis of rotation, thereby deflecting the solution in a forward and downward direction when the cathode is rotated.

References Cited

UNITED STATES PATENTS

| | | | |
|---|---|---|---|
| 300,950 | 6/1884 | Cassel | 204—212 |
| 1,066,570 | 7/1913 | Avery | 204—212 |
| 1,127,966 | 2/1915 | Cowper-Coles | 204—212X |
| 2,085,711 | 6/1937 | Biesmann | 204—212X |
| 2,791,555 | 5/1957 | Duisenberg et al. | 204—212 |
| 3,342,718 | 9/1967 | Adams | 204—271X |

FOREIGN PATENTS

| | | | |
|---|---|---|---|
| 1,022,529 | 12/1952 | France | 204—10 |
| 1,133,565 | 7/1962 | Germany | 204—109 |
| 1,176,373 | 8/1964 | Germany | 204—212 |

JOHN H. MACK, Primary Examiner

A. C. PRESCOTT, Assistant Examiner

U.S. Cl. X.R.

204—109, 271, 280